United States Patent [19]

Maeno et al.

[11] Patent Number: 4,811,039
[45] Date of Patent: Mar. 7, 1989

[54] CAMERA

[75] Inventors: Hiroshi Maeno, Tokyo; Hideo Tamamura, Kanagawa, both of Japan

[73] Assignee: Canon Kabushiki Kaisha, Tokyo, Japan

[21] Appl. No.: 869,102

[22] Filed: May 30, 1986

[30] Foreign Application Priority Data

Jun. 4, 1985 [JP] Japan .................. 60-085087
Jun. 4, 1985 [JP] Japan .................. 60-085088
Jun. 25, 1985 [JP] Japan .................. 60-095878
Jun. 25, 1985 [JP] Japan .................. 60-095879

[51] Int. Cl.$^4$ ........................... G03B 17/08
[52] U.S. Cl. ........................... 354/64; 354/288
[58] Field of Search ............ 354/64, 288; 249/83; 264/138

[56] References Cited

U.S. PATENT DOCUMENTS 3,065,666 11/1962 Sampson .................. 354/64
3,206,017 9/1965 Williams .................. 264/138 X
3,906,535 9/1975 Takahama et al. ........ 354/288 U

FOREIGN PATENT DOCUMENTS 59-164539 9/1984 Japan .

Primary Examiner—W. B. Perkey
Attorney, Agent, or Firm—Fitzpatrick, Cella, Harper & Scinto

[57] ABSTRACT

In a camera having the body thereof molded with optical members inserted in a synthetic resin material, the parts of the resin material covering the periphery of each of the optical members on the inner and outer sides thereof are arranged to have a thickness ratio varying between about 1:0.5 and about 1:2. Each of chamfers "c" which are provided on the optical member in the direction of thickness "t" thereof is arranged to be about 0.1 (mm)$\leq c \leq$ about 0.2 t. Further, each intersecting angular part between two adjacent sides of the optical member is chamfered with the chamfer measuring about 0.1 l to 0.45 l or thereabout relative to the length l of the shorter of the two sides. The bevelling arrangement prevents the optical members from cracking due to uneven stress developing during the forming and contracting processes of insert molding.

7 Claims, 8 Drawing Sheets

CAMERA

BACKGROUND OF THE INVENTION

1. Field of the Invention:

This invention relates to a camera designed to prevent optical members from cracking during the process of molding the camera body with a resin material, with the optical members of the camera inserted in the resin material.

2. Description of the Related Art:

There have recently been proposed various cameras of the kind having the whole camera body molded with a synthetic resin material. In this instance, the camera body must be provided with optical systems such as a photo-taking lens system, a viewfinder optical system, etc. These optical members can be simply arranged by inserting them into the camera body during the process of molding the camera body. Besides, such insert molding is highly advantageous in obtaining a water-tight seal for a water-proof camera. In inserting the optical member in the camera body, the optical member is first interposed in between the molding dies. Then, after tightening the dies together, a molten plastic or synthetic resin material is poured in. After completion of a forming process, the dies are opened. However, the optical member which is, for example, made of a glass material, tends to crack due to difference in the degree of deformation due to changes taking place in temperature during the plastic pouring process or when the plastic material shrinks during a cooling process. This has resulted in a low rate of yield.

SUMMARY OF THE INVENTION

To solve the above-stated problem, it is a principal object of the present invention to provide a camera which is of the kind having the camera body molded with a resin material with optical members inserted in the resin material and is arranged to prevent the above-stated optical members from cracking due to uneven stress occurring during the forming and contracting processes of insert molding. The camera according to the present invention is arranged in the following manner: The parts of the resin material covering the periphery of each of the optical members on the inner and outer sides thereof are arranged to have a thickness ratio varying between about 1:0.5 and about 1:2; each of chamfers "c" which are provided on the optical member in the direction of the thickness "t" thereof is arranged to be about 0.1 (mm)≦c≦about 0.2 t; and each intersecting angular part between two adjacent sides of the optical member is chamfered, with the chamfer measuring about 0.1 l to 0.45 l or thereabout relative to the length l of the shorter of the two sides.

The above and further objects and features of this invention will become apparent from the following detailed description of preferred embodiments thereof taken in connection with the accompanying drawings.

BRIEF DESCRIPTION OF THE DRAWINGS

FIG. 6 is an oblique view showing the appearance of the camera. FIG. 7 is a sectional view taken along a line A—A of FIG. 6. FIG. 8 is an enlarged view showing the peripheral state of a view finder optical system. FIG. 9 is an illustration of the view finder optical system arranged according to this invention.

FIG. 10 is an oblique view showing the appearance of the camera. FIG. 11 is a sectional view taken along a line A—A of FIG. 10. FIGS. 12 and 13 are sectional views showing the arrangement of the embodiment. FIG. 14 is a sectional view showing holding members used for insert molding. FIG. 15 is an exploded oblique view showing the members shown in FIG. 14.

FIG. 16 is a sectional view showing the plastic cover of the water-proof camera. FIG. 17(a) is a sectional view showing the essential parts of FIG. 16 as under a molding operation. FIG. 17(b) is an oblique view showing the dies of FIG. 17(a) as in an open state. FIG. 18 is an enlarged view of a part C shown in FIG. 17. FIG. 19 is a sectional view of the dies as in a state of being opened. FIG. 20 is a sectional view showing a pin hole formed by a glass holding pin. FIG. 21 is a sectional view showing an example of modification of the arrangement of FIG. 18.

DETAILED DESCRIPTION OF THE PREFERRED EMBODIMENTS

Figure 1:
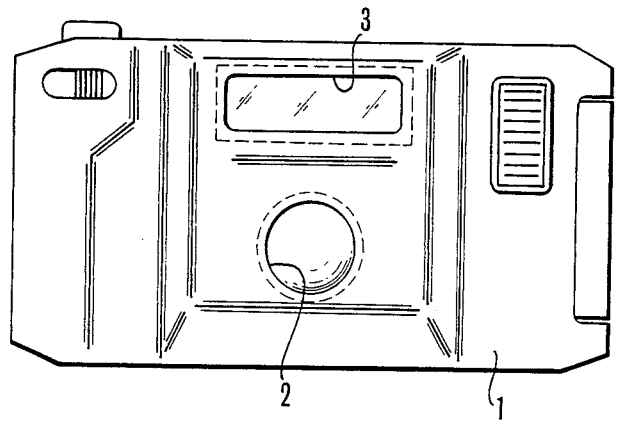
FIG. 1 is a front view of a water-proof camera embodying this invention.
Figure 2:
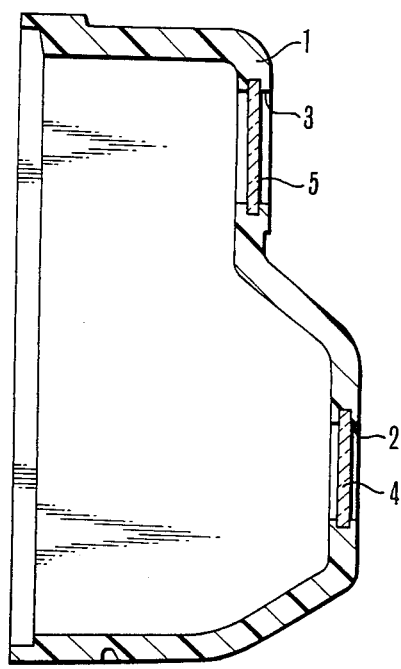
FIG. 2 is a sectional view of a plastic cover of the camera of FIG. 1.

Embodiments of this invention are arranged as described below with reference to the accompanying drawings:

In FIGS. 1 and 2, reference numeral 1 denotes a plastic cover which forms the body of a water-proof camera. The plastic cover 1 is provided with window parts 2 and 3 for a photo-taking lens system and a viewfinder system as shown in FIG. 1. To make these window parts 2 and 3 water-tight, glass pieces 4 and 5 which are employed as optical members are inserted in the windows respectively. The window part 2 is in a circular shape and the window part 3 in a rectangular shape. The glass piece 4 which is inserted in the window 2 is of the same shape as the latter but is a little larger than the latter. This little larger portion of the peripheral area of the glass piece is buried in the plastic cover. The glass piece 5 which is inserted in the other window 3 is of the same shape as but is a little larger than the window 3. The little larger portion of the peripheral area of the glass piece 5 is also buried in the plastic cover. The glass pieces 4 and 5 inserted in the window parts 2 and 3 thus in shapes corresponding to those of the windows 2 and 3, respectively, for the purpose of ensuring that the filling pressure and the contracting force of the plastic material are exerted uniformly over the whole circumference and periphery of the glass pieces during the process of filling the dies with the plastic material.

Figure 3A:
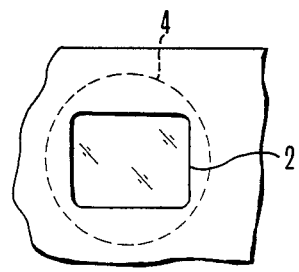
FIG. 3(a) is an illustration showing a case where a glass piece and a window are arranged to be in different shapes from each other.
Figure 3B:
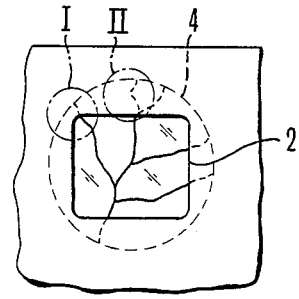
FIG. 3(b) is an illustration showing a cracked state of the glass.

If the glass piece 4 is arranged to be, for example, in a circular shape while the window part 2 is in a rectangular shape as shown in FIG. 3(a), the glass piece 4 would be cracked by the unequal states of parts I and II as shown in FIG. 3(b).

Figure 4:
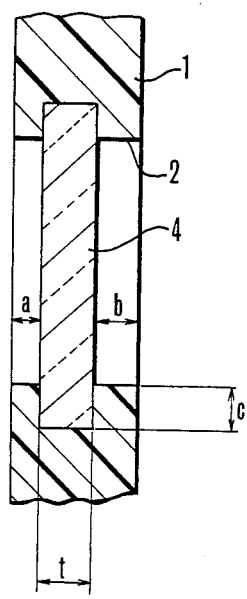
FIG. 4 is a sectional view showing the essential parts of FIG. 2.

The thickness of plastic parts forming the peripheral areas of the window parts 2 and 3 on the inner and outer sides of each of these windows differ in the ratio of a:b as shown in FIG. 4. The thickness ratio between the inner and outer sides is arranged to be in a ratio between about 1:0.5 and about 1:2. The end faces of the peripheral plastic areas on the inner and outer sides of the window parts 2 and 3 are arranged to be on the same level. The difference in thickness between the plastic walls on the inner and outer sides and the arrangement to have the plastic end faces on the same level are contrived to ensure that each of the glass pieces has uniform filling pressure and uniform contracting force applied to the whole periphery thereof during the process of filling the dies with the plastic material. The glass pieces 4 and 5 are inserted in the same manner. Therefore, the following description of the manner in which these glass pieces are inserted in the window parts covers only the glass piece 4.

Figure 5:
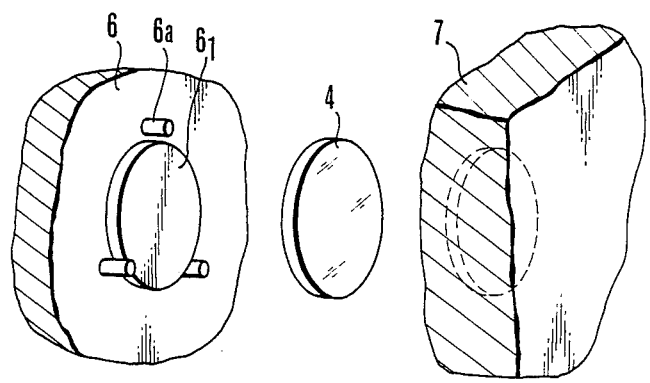
FIG. 5 is an oblique view showing dies as in an opened state.

Referring to FIG. 5, the glass piece 4 is carried by holding pins 6a in between dies 6 and 7. The dies are tightened together. After that, molten plastic material is poured into the dies. After completion of molding, the dies are opened. During the process of filling the dies with the plastic material and during the process of the contraction of the plastic material, the filling pressure and the contracting force are uniformly applied to the glass piece 4 over the whole circumference thereof as the shape of the glass piece corresponds to that of the window part. Therefore, the glass piece never cracks. Further, the thickness difference and the arrangement to have the end faces of the plastic walls on the same level further ensures the uniform application of the filling pressure and the contracting force to the whole peripheral part of the glass piece. The inner wall thickness a and the outer wall thickness b are preferably in the relation of $t \geq a$ and $t \geq b$ to the thickness t of the glass piece. If they are thicker than the thickness t of the glass piece, the strength of the glass piece would become insufficient (as its thickness is thinner than the plastic wall thickness) for the stress developing during the forming and contracting processes of the insert molding operation. Further, for the same reason, the depth c to which the glass piece 4 is to be inserted in the cover 1 is preferably $t \geq c$. Further, the probability of cracking of the glass piece due to uneven stress developed at the time of forming or molding and contraction can be eliminated by arranging these values a, b and c to be between 0.5 and 2 with these values considered in the ratio of a:b:c.

Figure 6:
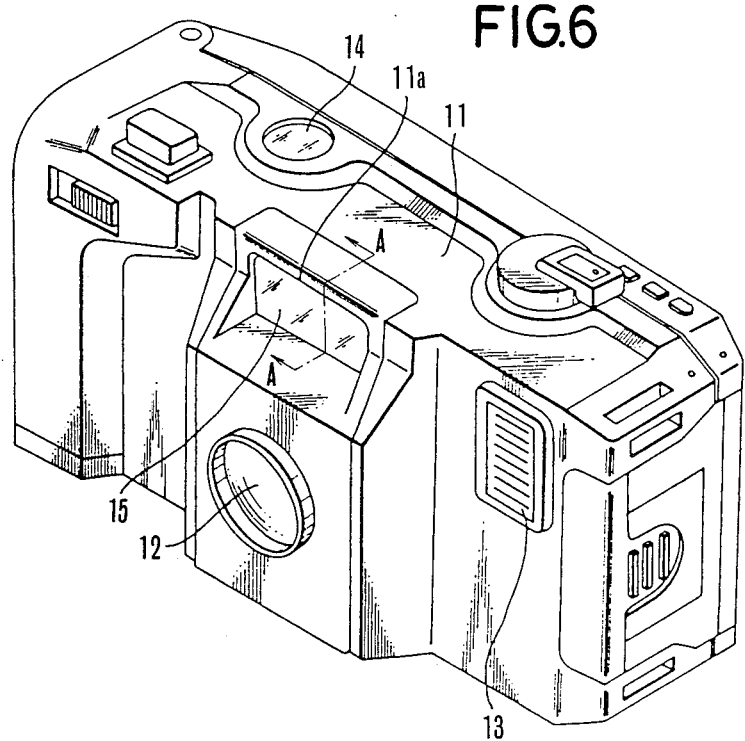
FIGS. 6 to 9 show a camera arranged in accordance with another embodiment of this invention.
Figure 7:
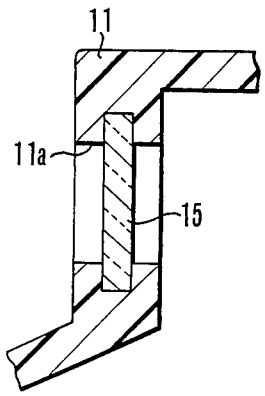
Figure 8:
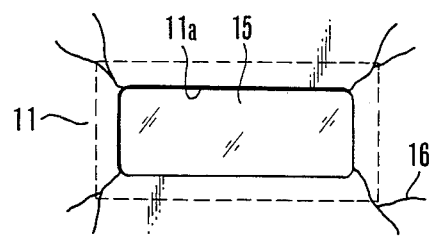

Another embodiment of this invention is arranged as follows: FIG. 6 shows the appearance of the camera having a water-proof structural arrangement according to this invention. Referring to FIG. 6, a camera body 11 is formed with a synthetic resin material. The illustration includes a photo-taking lens 12; a flash light emitting part 13; a counter window 14; and a view finder optical system 15 which is of a rectangular shape. An optical member which is made of a glass material is inserted, by molding, into a view finder aperture part 11a of the camera body 11. FIG. 7 is a sectional view of the view finder optical system 15 taken along a line A—A of FIG. 6. The optical member 15 which forms the viewfinder optical system has its peripheral part carried on both sides by the camera body 11 made of the synthetic resin material as shown in FIG. 7 as a result of insert molding. The optical member 15 is thus secured to the view finder aperture part 11a. FIG. 8 shows the peripheral area of the view finder aperture part 11a. A reference numeral 16 denotes cracks present in the angular parts of the view finder aperture part 11a. These cracks result from an internal stress developing due to a difference between the glass material and the synthetic resin material in coefficient of contraction caused by a change in temperature from a high temperature to a low temperature when the camera body is molded with the viewfinder optical system 15 inserted therein. The thermal expansion coefficient of a poly-carbonate resin material used for the camera body (which is assumed to consist 12% of glass fiber) is about $50 \times 10^{-6}$. Whereas, that of the glass material is about $8 \times 10^{-6}$. The temperature of the dies to be used for molding is approximately 100° C. Assuming that the typical size of the glass piece is 40 mm, for example, the degree of contraction which takes place from the typical size when the temperature comes back to the room temperature 20° C. can be computed as follows: The poly-carbonate resin material contracts $50 \times 10^{-6} (100-20) \times 40 = 0.16$ mm while the glass piece contracts $8 \times 10^{-6} \times (100-20) \times 40 = 0.026$ mm. Therefore, within the area of 40 mm, the dimensional difference between the two becomes $0.16 - 0.026 = 0.134$ mm. Whereas, since the two are in actuality sticking to each other, this difference causes the two to bring about internal stress in each other.

Figure 9:
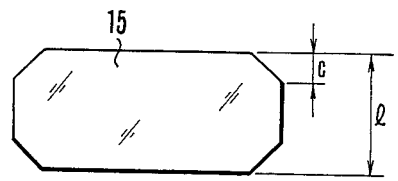

The inventors of the present invention found that these cracks are triggered by contact points where angular parts of the view finder optical system 15 are in contact with the camera body 11. They have then successfully solved this problem by chamfering the edge parts of the view finder optical system 15. FIG. 9 shows this. Referring to FIG. 9, with the shorter side length of the optical member which forms the view finder optical system 15 assumed to be l, each chamfer c is arranged to be about 0.1 $l \leq c \leq 0.45$ l. This arrangement of the chamfers effectively prevents the resin material from cracking. In short, the conventional edge angle of about 90 degrees which has caused the cracks is replaced with two obtuse angles of 135 degrees for preventing the cracks.

In the foregoing description of the embodiment, this invention is applied for inserting the viewfinder optical system into the resin material of the camera body during insert molding. The inventive method likewise advantageously applies for inserting in the resin material any other optical members such as a photo-taking lens, a distance measuring window, etc. that are made of a glass material and have angular or angulate parts. The above-stated chamfering shape may be replaced with some other chamfering shape similar or close thereto such as a curved face.

Figure 10:
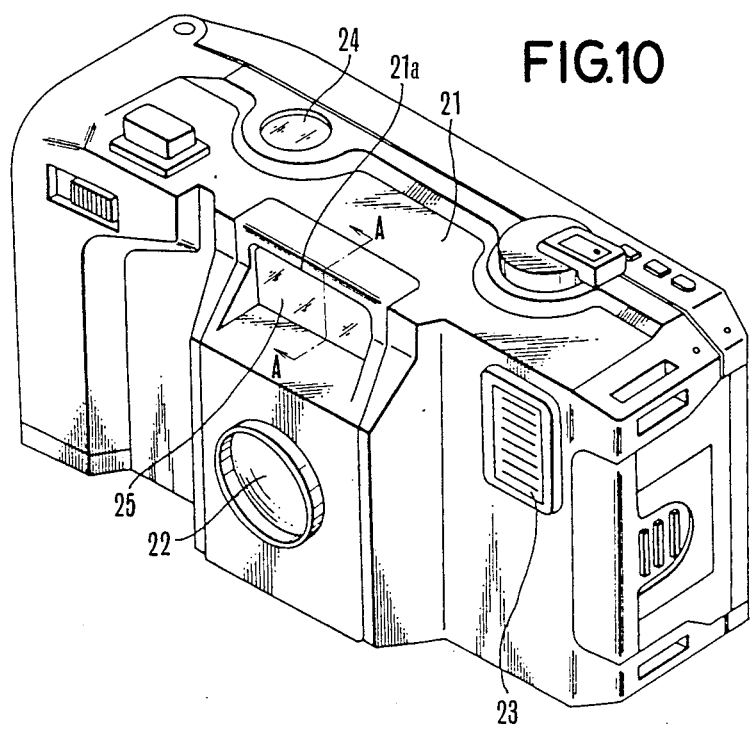
FIGS. 10 to 15 are illustrations of a camera arranged as a further embodiment of this invention.
Figure 11:
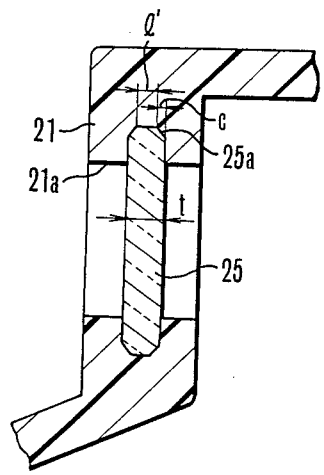

A further embodiment of this invention is arranged as follows: FIG. 10 shows the appearance of a camera which is similar to the camera of FIG. 6. The camera comprises a camera body 21 made of a synthetic resin material; a photo-taking lens 22; a flash light emitting part 23; a counter window 24; and a viewfinder optical system 25 of a rectangular shape. An optical member which is made of a glass material is inserted into a viewfinder aperture part 21a by insert molding. FIG. 11 is a sectional view of the view finder optical system 25 taken along a line A—A of FIG. 10. The periphery of the optical member which forms the viewfinder optical system 25 is carried on both sides thereof by the synthetic resin material walls of the camera body 21 as a result of insert molding. Each of the edge parts 25a of the viewfinder optical system 25 is chamfered into a chamfer c in relation to the thickness t of the system 25. The chamfer c is arranged to be approximately 0.1 (mm)≦c≦0.2 t. This dimensional range of chamfer has been obtained through tests conducted by the inventors of the present invention. The crack can be effectively prevented from being caused by the edge part 25a during insert molding if the chamfer c is arranged to be at least about 0.1 (mm). Meanwhile a sufficient degree of water-tightness is attainable by arranging the chamfer c so as not to exceed 0.2 t. The water-tightness is numerically substantiated as follows: The thermal expansion coefficient of the poly-carbonate resin material is about $50 \times 10^{-6}$ (with 12% of glass fiber contained therein) while that of the glass material is about $8 \times 10^{-6}$. The temperature of the dies for molding is about 100° C. Assuming that the typical dimension of the glass piece is 40 mm, contraction from this typical dimension which takes place when the temperature comes back to the room temperature of 20° C. after molding can be computed as follows: The poly-carbonate material contracts $$50 \times 10^{-6} (100-20) \times 40 = 0.16 \text{ mm}.$$

The glass material contracts $$8 \times 10^{-6} (100-20) \times 40 = 0.026 \text{ mm}.$$

Within the area of dimension 40 mm, therefore, there arises a dimensional difference 0.16–0.134 mm between the two. However, in actuality, they are sticking to each other, this difference causes the two to bring about the internal stress of each other.

Figure 12:
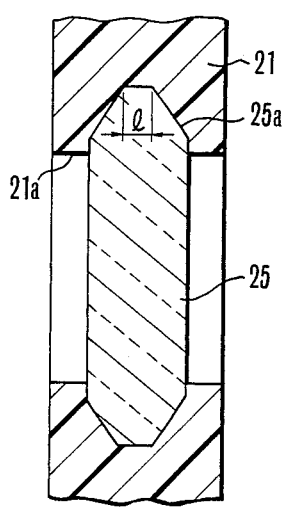
Figure 13:
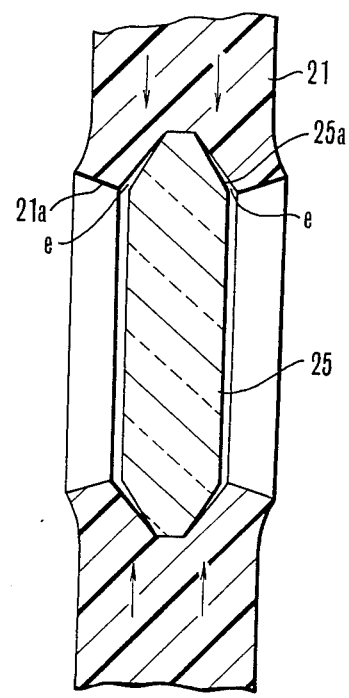

If the edges of the glass piece are excessively chamfered as shown in FIG. 12, this stress cannot be absorbed alone by the width l and then would result in gaps e as shown in FIG. 13. Whereas, in the case of a small chamfer c as shown in FIG. 11, the width l' for receiving the internal stress is wide enough to give a mechanism of preventing water from coming in with a high degree of stress acting within the width part l'.

Figure 14:
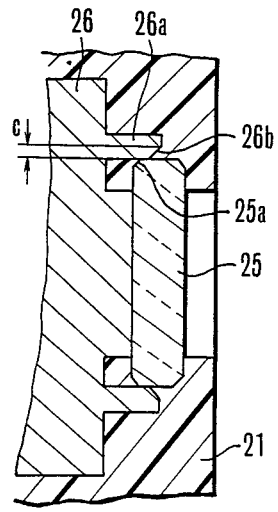
Figure 15:
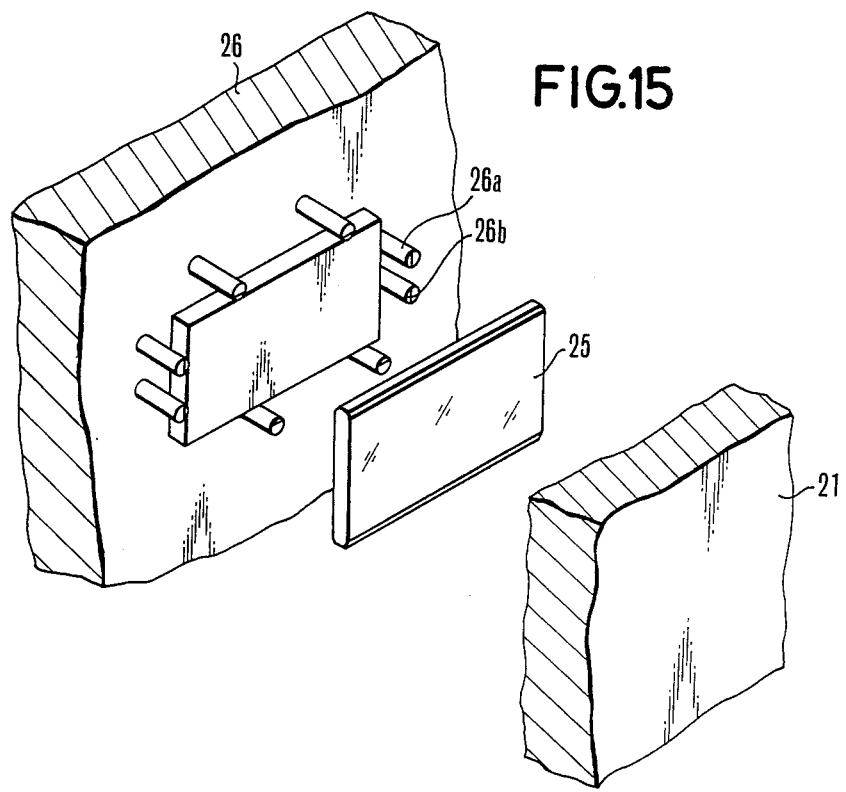

FIGS. 14 and 15 show a holding member to be used in molding the camera body with the optical member inserted in a resin material. In these drawings, reference numerals 21 and 25, respectively denote the camera body and the viewfinder optical system of FIG. 10. The holding member 26 is arranged as follows: In inserting the viewfinder optical system 25 in the camera body 21 in carrying out insert molding, the optical system 25 is placed among the pins 26a of the holding member 26 to be thus carried by these pins. After that, the camera body 21 is insert molded with the viewfinder optical system 25 inserted. Upon completion of insert molding, the holding member 26 is taken away together with the pins 26a. However, since the chamfer c of the view finder optical system 25 is arranged to be not exceeding 0.2 t for the purpose of attaining a sufficient degree of water-tightness as mentioned above, a crack tends to occur if the end face 25a of the optical system 25 comes to on the end part 26b of some of the pins 26a in attaching the optical system 25 to the holding member 26. To solve this problem, in the case of this embodiment, the end part 26b of each of the pins 26a which comes in contact with the viewfinder optical system 25 is also provided with a chamfer c measuring approximately 0.1 (mm) to approximately 0.2 (mm). The possibility of the above-stated crack in the view finder optical system 25 is eliminated by thus facilitating the setting operation on the optical system 25 among the pins 26a.

In the foregoing description of this embodiment, the invention is described as applied to process of molding the camera body with the viewfinder optical system inserted therein. However, the inventive method is of course likewise applicable to an insert molding process of inserting other optical members such as a photo-taking lens, a distance measuring window, etc. that are made of a glass material and have angulate parts into the resin material of the camera body. Further, the above-stated chamfering shape may be replaced with some other shape similar thereto, such as a curved face, etc. A still further embodiment of this invention is arranged as described below.

Figure 16:
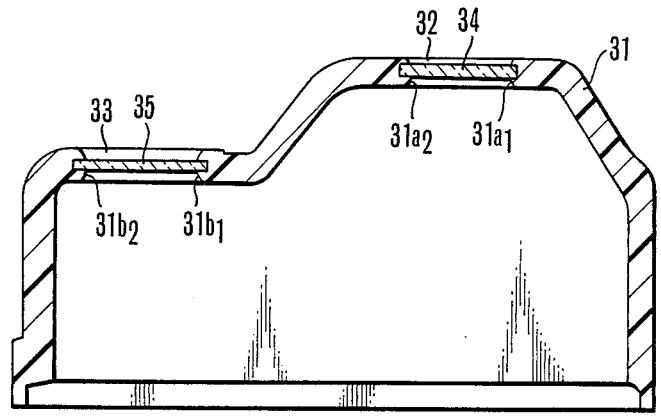
FIGS. 16, 17(a), 17(b) and 18 to 21 show a water-proof camera arranged as still further embodiment of this invention.
Figure 17A:
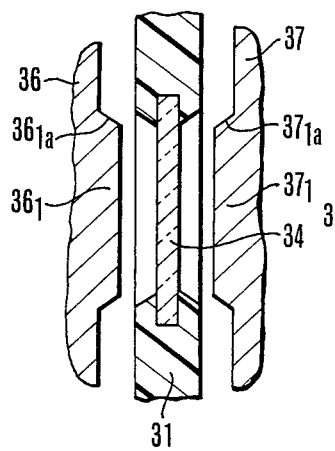
Figure 17B:
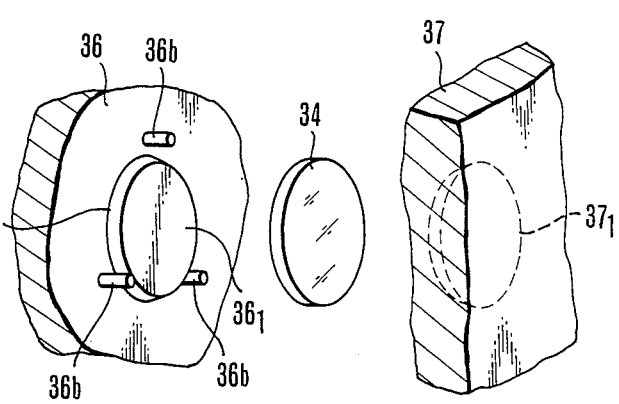
Figure 18:
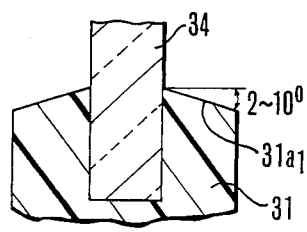
Figure 19:
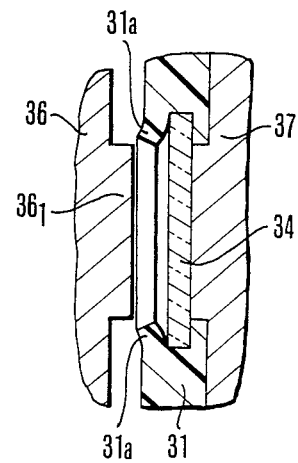

Referring to FIG. 16 which shows the embodiment in a sectional view, a plastic cover 31 forms a water-tight camera body. The plastic cover 31 is provided with window parts 32 and 33 for a photo-taking lens system and a viewfinder system. To make these window parts 32 and 33 water tight, for example, glass pieces 34 and 35 are inserted as optical member. These glass pieces 34 and 35 are respectively of circular and rectangular shapes. It is only the peripheral parts of the circular and rectangular shapes of these glass pieces that are inserted in the plastic cover. The end faces 31a1, 31a2, 31b1 and 31b2 of the plastic cover forming the peripheries of the window parts 32 and 33 are formed into a tapered shape having an inclination required for pulling them out of the dies. These plastic end faces 31a1, 31a2, 31b1 and 31b2 are in a specular finished state. More specifically, referring to FIGS. 17(a) and 17(b), dies 36 and 37 are provided with protruding parts $36_1$ and $37_1$. The peripheral faces $36_{1a}$ and $37_{1a}$ of the protruding parts are tapered and is provided with specular finish to have a small coefficient of friction. Meanwhile, the tapered plastic end faces 31a1, 31a2, 31b1 and 31b2 have an inclination angle between about 2 degrees and about 10 degrees as shown in FIG. 18. With the inclination set in this manner, the pulling out inclination provided on the side of the dies 36 and 37 is also determined to be between about 2 and 10 degrees or thereabout. If the inclination of the dies 36 and 37 is arranged to be less than 2 degrees, the plastic end parts which form the peripheries of the window parts 32 and 33 tend to have a turn-up portion 31a as shown in FIG. 19 when the dies are opened. Conversely, if the inclination on the side of the dies is arranged to be greater than 10 degrees, fins might appear during the forming process along a joint between the glass piece 34 or 35 and the window part 32 or 33 of the plastic cover. In the event of inclination exceeding 30 degrees which can be hardly regarded as die-pulling-out inclination, the fins occur almost without fail.

The glass pieces 34 and 35 are inserted in the same manner. Therefore, the following description of the process for inserting the glass piece covers only the glass piece 34. The glass piece 34 is interposed in between the dies 36 and 37 while being carried by the holding pins 36b as shown in FIG. 17(b). After the dies are tightened together, a molten plastic material is poured into the dies. After completion of a forming process, the dies 36 and 37 are separated from each other as shown in FIG. 17(a). In this instance, since the dies are provided with the pulling-out inclination of about 2 to 10 degrees with the tapered faces provided with specular finish surfaces, the end faces 31a1, 31a2, 31b1 and 31b2 which form the peripheral parts of the window parts 32 and 33 have also tapered specular surfaces at an inclination between 2 and 10 degrees or thereabout. There is produced no turn-up portions in the end faces 31a1, 31a2, 31b1 and 31b2 of the plastic cover.

Figure 20:
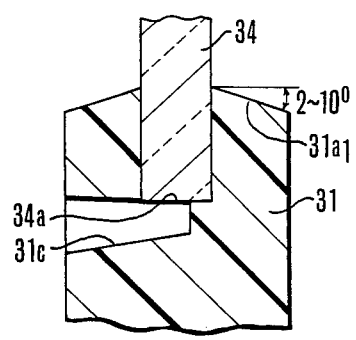

The glass holding pins 36b of the dies 36 and 37 are preferably arranged to have a pulling-out inclination and to be in such a shape that gives a pin hole 31c as shown in FIG. 20. Further, in this instance, the glass piece 34 is preferably provided with fairly finely polished end faces 34a instead of ordinary roughly ground face. Such arrangement further lessens die separating resistance and lessens the possibility of cracking the glass material.

Figure 21:
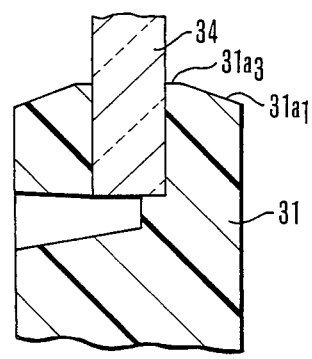

Further, the pulling-out end face of the plastic cover does not completely tapered. It may be allowed to have a non-inclining flat face part 31a3 in the immediate vicinity of the glass piece 34 with the rest of the end face formed into the tapered part 31a1 as shown in FIG. 21.

In the camera which is arranged according to this invention as described in the foregoing to have the camera body molded with the optical members inserted in the resin material, the arrangement according to this invention effectively prevents the optical members from cracking and the resin material from having turn-up parts during the insert molding operation. The invention thus gives a great advantageous effect.

What is claimed is:

1. A camera comprising:
   (a) each optical member having each intersecting angular part between two adjacent sides thereof chamfered, said chamfered part measuring approximately 0.1 l to 0.45 l relative to the length l of the shorter of said two adjacent sides; and
   (b) a camera body molded with a resin material with said optical member inserted in said resin material in molding said camera body with said resin material.

2. A camera according to claim 1, wherein said optical member includes a glass material.

3. A camera according to claim 1, wherein said camera is arranged to be a water-proof camera.

4. A camera comprising:
   (a) an optical member, said optical member having chamfers c in the direction of the thickness t thereof, each of said chamfers being arranged to be approximately 0.1 (mm) $\leq c \leq$ approximately 0.2 t; and
   (b) a camera body which is molded with a resin material, with said optical member inserted therein.

5. A camera according to claim 4, wherein said optical member includes a glass material.

6. A camera according to claim 4, wherein said camera is arranged to be a water-proof camera.

7. A camera according to claim 4, further comprising holding pins for holding said optical member when said optical member is inserted in place, said holding pins having a chamfer measuring about 0.1 (mm) to about 0.2 (mm) at their end portions which come into contact with said optical means.

* * * * *

UNITED STATES PATENT AND TRADEMARK OFFICE
CERTIFICATE OF CORRECTION

PATENT NO. : 4,811,039
DATED : March 7, 1989
INVENTOR(S) : Hiroshi Maeno, et al.

It is certified that error appears in the above-identified patent and that said Letters Patent is hereby corrected as shown below:

COLUMN 2:

Line 61, "inserted" should read --are inserted--.

COLUMN 3:

Line 8, "differ" should read --differs--.

COLUMN 5:

Line 33, "0.16-0.134 mm" should read --0.16-0.026 = 0.134 mm--.

Line 63, "to on" should read --to impinge on--.

COLUMN 6:

Line 37, "is" should read --are--.

Line 49, "turn-up portion 31a" should read --turned-up portion 31a--.

UNITED STATES PATENT AND TRADEMARK OFFICE
CERTIFICATE OF CORRECTION

PATENT NO. : 4,811,039

DATED : March 7, 1989

INVENTOR(S) : Hiroshi Maeno, et al.

It is certified that error appears in the above-identified patent and that said Letters Patent is hereby corrected as shown below:

COLUMN 7:

Line 6, "turn-up portions" should read --turned-up portions--.

Line 19, "not completely" should read --not have to be completely--.

Line 30, "turn-" should read --turned---.

COLUMN 8:

Line 2, "each optical member" should read --an optical member-- and "each" (second occurrence) should read --an--.

Line 17, "chamfers c" should read --a chamfer c--.

UNITED STATES PATENT AND TRADEMARK OFFICE
CERTIFICATE OF CORRECTION

PATENT NO. : 4,811,039

DATED : March 7, 1989

INVENTOR(S) : Hiroshi Maeno, et al.

It is certified that error appears in the above-identified patent and that said Letters Patent is hereby corrected as shown below:

COLUMN 8:

Line 18, "each of said chamfers" should read --said chamfer--.

Line 32, "optical means." should read --optical member.--.

Signed and Sealed this

Twenty-eighth Day of November 1989

*Attest:*

JEFFREY M. SAMUELS

*Attesting Officer*      *Acting Commissioner of Patents and Trademarks*